US011516082B1

(12) United States Patent
Zhang et al.

(10) Patent No.: US 11,516,082 B1
(45) Date of Patent: Nov. 29, 2022

(54) CONFIGURATION OF A BASEBOARD MANAGEMENT CONTROLLER (BMC) GROUP LEADER RESPONSIVE TO LOAD

(71) Applicant: Lenovo Global Technology (United States) Inc., Morrisville, NC (US)

(72) Inventors: Caihong Zhang, Shanghai (CN); Ming Lei, Shanghai (CN); Fred Allison Bower, III, Durham, NC (US); Hai Jun Xu, Shanghai (CN)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 0 days.

(21) Appl. No.: 17/710,307

(22) Filed: Mar. 31, 2022

(51) Int. Cl.
*G06F 15/173* (2006.01)
*H04L 41/0823* (2022.01)

(52) U.S. Cl.
CPC .............................. *H04L 41/0823* (2013.01)

(58) Field of Classification Search
CPC .................................................. H04L 41/0823
See application file for complete search history.

(56) References Cited

U.S. PATENT DOCUMENTS

| | | | |
|---|---|---|---|
| 2003/0172145 A1* | 9/2003 | Nguyen | H04L 12/185 709/223 |
| 2007/0097465 A1* | 5/2007 | Kobayashi | G03G 15/0194 358/518 |
| 2017/0099165 A1* | 4/2017 | Mitra | H04L 25/03203 |
| 2017/0147656 A1* | 5/2017 | Choudhary | G06F 16/256 |
| 2018/0088932 A1* | 3/2018 | Ouarraoui | G06F 3/0689 |
| 2022/0232423 A1* | 7/2022 | Thyagaturu | H04W 28/08 |

* cited by examiner

*Primary Examiner* — Thanh T Nguyen
(74) *Attorney, Agent, or Firm* — Jeffrey L. Streets; Streets Law Firm PC

(57) ABSTRACT

A method includes various operations and a computer program product may cause a processor to perform various operations. The operations include obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. The operations further include, in response to a second BMC in the BMC group having less load than any other BMC in the BMC group, configuring the second BMC to operate as the BMC group leader and unconfiguring the first BMC to no longer operate as the BMC group leader. Still further, the operations include causing the second BMC to perform a BMC group operation operating as the BMC group leader.

20 Claims, 5 Drawing Sheets

CONFIGURATION OF A BASEBOARD MANAGEMENT CONTROLLER (BMC) GROUP LEADER RESPONSIVE TO LOAD

BACKGROUND

The present disclosure relates to the use and management of baseboard management controllers in a computing system having a plurality of servers.

BACKGROUND OF THE RELATED ART

A baseboard management controller (BMC) is a small computer that resides on a motherboard of a server and some other devices, such as higher-end switches, to provide remote monitoring and control of the server. Redfish is the current standard used to expose the BMC functions as defined by the Distributed Management Task Force (DMTF) and largely replaces the older Intelligent Platform Management Interface (IPMI) standard. The BMC is a specialized microcontroller that is embedded on the motherboard of a computer server and has its own firmware and memory. The BMC manages the interface between system-management software and platform hardware BMC.

The BMC monitors the server hardware by receiving input from various sensors built into the server, including such input as component temperatures, cooling fan speeds, power status, and the like. Furthermore, the BMC can send alerts and operating data to a system administrator over a network under various conditions. The administrator may also remotely communicate with the BMC to take some corrective actions, such as resetting or power cycling the server to get a hung operating system running again. Some BMCs may also have out-of-band embedded web-server interface functionality, enabling an administrator to monitor and take action via the BMC from a remote computer with a web-browser. Other out-of-band interfaces include an Intelligent Platform Management Interface (IPMI), Redfish interface, and Common Information Model (CIM) interface.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations comprise obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. The operations further comprise, in response to a second BMC in the BMC group having less load than any other BMC in the BMC group, configuring the second BMC to operate as the BMC group leader and unconfiguring the first BMC to no longer operate as the BMC group leader. Still further, the operations comprise causing the second BMC to perform a BMC group operation operating as the BMC group leader.

Some embodiments provide a computer program product comprising a non-volatile computer readable medium and non-transitory program instructions embodied therein, the program instructions being configured to be executable by a processor to cause the processor to perform various operations. The operations comprise periodically obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. The operations may further comprise, in response to a second BMC in the BMC group having a lower amount of load than the first BMC, configuring the second BMC to operate as the BMC group leader and unconfiguring the first BMC to no longer operate as the BMC group leader. Still further, the operations may comprise causing the second BMC to perform a BMC group operation operating as the BMC group leader. It should also be recognized that the present computer program product embodiment may further include any of the operations described herein in reference to another computer program product embodiment.

Some embodiments provide a method comprising obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. The method further comprises, in response to a second BMC in the BMC group having less load than any other BMC in the BMC group, configuring the second BMC to operate as the BMC group leader and unconfiguring the first BMC to no longer operate as the BMC group leader. Still further, the method comprises causing the second BMC to perform a BMC group operation operating as the BMC group leader. It should also be recognized that the method embodiments may further include any of the operations described herein in reference to a computer program product embodiment.

DETAILED DESCRIPTION

Figure 1:
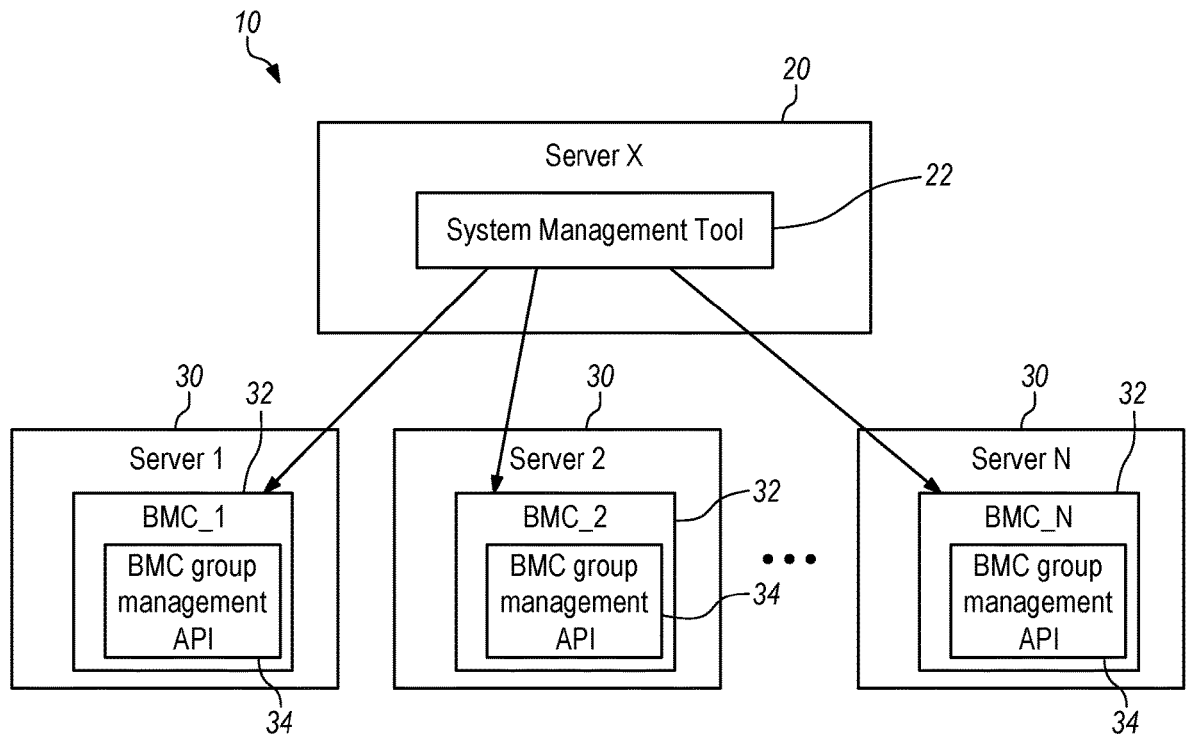
FIG. 1 is a diagram of a system including a system management server running a system management tool that is able to communicate with a baseboard management controller on each of a plurality of servers.

Some embodiments provide a computer program product comprising a non-volatile computer readable medium and non-transitory program instructions embodied therein, the program instructions being configured to be executable by a processor to cause the processor to perform various operations. The operations comprise obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. The operations further comprise, in response to a second BMC in the BMC group having less load than any other BMC in the BMC group, configuring the second BMC to operate as the BMC group leader and unconfiguring the first BMC to no longer operate as the BMC group leader. Still further, the operations comprise causing the second BMC to perform a BMC group operation operating as the BMC group leader.

In some embodiments, the computer program product may be referred to as a "system management tool". The system management tool may be run by a computer this is within, or not within, the computing system that includes the plurality of baseboard management controllers (BMCs). Using network access available to the computer, the system management tool may communicate with a BMC in the computing system. BMC group management is preferably enabled for each BMC. In one option, the system management tool may communicate with a BMC by calling a BMC group management API that is running on the BMC. For example, a system management application that includes the system management tool may run on a system management server and call the BMC group management API, such as a Redfish API, and cause a BMC to discover one or more neighboring BMC, create a new BMC group, join an existing BMC group, leave a BMC group and/or become the BMC group leader. In another option, the system management tool may communicate with an individual BMC through a web browser displaying a web-page at the Internet Protocol (IP) address configured in the BMC interface. In addition to embodiments of the system management tool being a web browser application or being included in a system management application, the system management tool may be a command line tool or a standalone application. Using any of these options to communicate with a BMC, the system management tool may cause the BMC to create a BMC group, join an existing BMC group, operate as the BMC group leader, discover one or more other BMCs, and/or invite any discovered BMC to join its BMC group. Furthermore, an authorized user may use the system management tool to initiate operations with an individual BMC or the BMC group, including a group operation such as a group firmware update.

Each BMC group may manage membership in either a master-slave (leader-follower) mode or a peer-to-peer mode. Furthermore, the system management tool, which may select and configure one of the BMCs in a BMC group to operate as the group leader, may be run on any computing system so long as the computing system is able to communicate with the relevant BMCs and call the corresponding BMC group management API. For example, the system management tool may be run on a computing system that does or does not include a BMC belonging to the BMC group being managed.

In some embodiments, the plurality of BMCs in a BMC group may include three or more BMCs and the BMC that is selected as the BMC group leader may be determined to have the lowest load of any of the BMCs in the BMC group. While performance gains may be achieved by shifting the BMC group leader responsibilities to any BMC in the BMC group that has a lower load than the current BMC group leader, it is preferable to optimize the performance gains by shifting the BMC group leader responsibilities to the BMC having the lowest load of any BMC in the BMC group.

BMC federation or group management functionality may be used to form a virtual federation group ("BMC group") for managing a set of servers via the BMC interface. After forming a BMC group, the BMC group may be used to increase the speed and/or efficiency of deploying configurations, firmware updates, operating systems, and/or other information or commands among neighbor servers in a local network. For example, a group configuration may be performed such that a user may populate the settings on one server via the BMC of that server and cause those settings to be populated on the servers of all other members of the BMC group. In another example, a group firmware update may be performed such that one BMC may download a firmware file from a central repository (CIFS/NFS), then distribute the group firmware update to all BMCs that are members of the BMC group. Each BMC in a BMC group may have the same capabilities and may implement a group function to the other members of the BMC group. The BMC that receives and implements a group operation for the BMC group is referred to as the BMC group leader.

In some embodiments, the system management tool may initiate a group operation by instructing the BMC group leader to cause the BMCs (i.e., "BMC group members") of BMC group to implement the group operation. Non-limiting examples of group operations include initiating deployment of a group firmware update, operating system, configuration setting(s), license installation, and/or call home functionality.

Embodiments may improve the balance of load between BMC group members to reduce or avoid the performance impacts experienced by being the BMC group leader under a high-load situation. A BMC group member may be selected to be the BMC group leader in a manner that optimizes performance in consideration of BMC processor load, BMC memory load and BMC configuration. An increase in an amount of workload placed on a BMC will cause a corresponding increase in thermal load, power consumption, and error processing. Accordingly, moving the workload associated with performing the functions of the BMC group leader from a first BMC in a BMC group to a second BMC in the BMC group will reduce the thermal load, power consumption and error processing of the first BMC and cause a similar increase in the thermal load, power consumption and error processing of the second BMC.

In some embodiments, the amount of load placed on each BMC is obtained from each of the individual BMCs. Preferably, the amount of load on a BMC is measured during a time period in which the BMC group leader is not performing a group operation as the BMC group leader. Accordingly, the amount of load obtained by system management tool for each BMC may be representative of an ongoing load on the BMC, such as the routine system management interface functions of monitoring and reporting operating conditions, absent any influence of a group operation. If the amount of load on each BMC is obtained during a group operation, it is possible that a BMC determined to have a lowest amount of load of any BMC in the BMC group may not actually be the best choice for BMC group leader. For example, a BMC that is currently the BMC group leader may not have the lowest amount of load within the BMC group during a group operation, and yet may have a lower or lowest amount of load attributable to routine system management interface operations. If the comparison of load on each BMC is not made under similar conditions (i.e., no group operations) or not corrected for any dissimilarity in conditions (i.e., correction for current group operations), then a new BMC group leader may be improperly selected and cause an even greater load on the new BMC group leader during a subsequent group operation than what the current BMC group leader would have experienced.

In some embodiments, the amount of load placed on each BMC may be an amount of processor load and/or an amount of memory load. For example, a processor load may be measured in units of millions of instructions per second (MIPS) and a memory load may be measured in units of input/output operations per second (IOPS).

In some embodiments, the obtained amount of load placed on each BMC may be either an instantaneous load or may be an average load for at least one trailing time period. Optionally, the system management tool may obtain the average BMC load for each of a plurality of trailing time periods, such as the average BMC load during the most recent 1 minute of operation, during the most recent 5 minutes of operation, and during the most recent 15 minutes of operation. In a further option in which the obtained amount of load placed on each BMC includes an average load for each of a plurality of trailing time periods, a BMC may be determined to have less load than any other BMC in the BMC group in response to the BMC having, for each of the plurality of trailing time periods, less average load than the average load of any other BMC in the BMC group.

In some embodiments, the operations of obtaining an amount of load from the BMCs in the BMC group and configuring a BMC group leader for the BMC group may be performed prior to instructing the BMC group leader to perform a group operation such as a firmware update. For example, the load data may be obtained from each BMC and the BMC group leader may be selected in anticipation of the system management tool instructing the BMC group leader to perform the group operation. Furthermore, by waiting to select and configure a BMC group leader until immediately prior to initiating a group operation, the amount of load obtained from each BMC is more likely to be current and representative of the load of routine system management interface operations that the BMC will be performing during the subsequent group operation.

In some embodiments, the system management tool may receive user input instructing a BMC to create the BMC group and/or receive user input as assigning one or more of the BMCs to the BMC group. In a separate option, the system management tool may receive user input instructing a BMC group to perform a group operation, such as a firmware update, in accordance with embodiments discloses herein. It should be understood that each of the BMCs serve as an interface between system management and the hardware of a server in which the BMC is installed, and wherein the amount of load placed on the BMC includes system management interface operations.

Some embodiments provide a computer program product comprising a non-volatile computer readable medium and non-transitory program instructions embodied therein, the program instructions being configured to be executable by a processor to cause the processor to perform various operations. The operations comprise periodically obtaining, for each of a plurality of baseboard management controllers (BMCs) that have been configured to form a baseboard) management controller (BMC) group, an amount of load placed on the BMC, wherein a first BMC in the BMC group has been configured to operate as a BMC group leader for the BMC group. The operations may further comprise, in response to a second BMC in the BMC group having a lower amount of load than the first BMC, configuring the second BMC to operate as the BMC group leader and unconfiguring the first BMC to no longer operate as the BMC group leader. Still further, the operations may comprise causing the second BMC to perform a BMC group operation operating as the BMC group leader. It should also be recognized that the present computer program product embodiment may further include any of the operations described herein in reference to another computer program product embodiment.

Some embodiments provide a method comprising obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. The method further comprises, in response to a second BMC in the BMC group having less load than any other BMC in the BMC group, configuring the second BMC to operate as the BMC group leader and unconfiguring the first BMC to no longer operate as the BMC group leader. Still further, the method comprises causing the second BMC to perform a BMC group operation operating as the BMC group leader. It should also be recognized that the method embodiments may further include any of the operations described herein in reference to a computer program product embodiment.

Some embodiments provide the technical benefit of minimizing the impact of a greater processor and/or memory workload or overhead on the BMC group leader by identifying the BMC within the BMC group that has a lower workload and shifting the BMC group leader role to the identified BMC. Dynamically moving the workload of the BMC group leader functions to a BMC have a lower workload improves the functioning of the computing system, a server within the computing system and/or a BMC within one of the servers by minimizing the likelihood that any one of the BMCs in a BMC group will become overloaded and slow to perform the various functions or operations of the BMC, including the BMC group leader performing group functions in addition to routine system management interface functions.

In one experiment, a BMC group leader exhibited an idle rate of 84.1% while performing only the normal load of routine system management interface functions. However, during a firmware update process in which the BMC group leader was sending sequential Redfish requests to the other BMC group members, the idle rate of the BMC group leader was 61.8%. The reduction of the BMC group leader idle rate from 84.1% to 61.8% indicates that the BMC load increased around 20% when performing the group leader functions associated with a group firmware update. It is expected that system management functions will continue increase in complexity over time and that the load on each BMC may increase to a point where performance impacts will negatively affect the performance of the BMC. Accordingly, the ability to intelligently and dynamically move the load associated with being the BMC group leader will improve the overall performance of the computing system and/or an individual server.

FIG. 1 is a diagram of a system 10 including a system management server 20 running a system management tool 22 that is able to communicate with a baseboard management controller (BMC) 32 on each of a plurality of servers 30. Each BMC serves as an interface between system management, including the system management tool 22, and the hardware of a server 30 in which the BMC is installed. Examples of the server hardware include a central processing unit (CPU), memory, data storage, and network interfaces (See FIG. 4).

Each BMC 32 has a BMC group management API 34 that facilitates communication with the system management tool 22 on the system management server 20 or other computer. Specifically, the system management tool 22 may call the BMC group management API 34 of any BMC 32 and provide an instruction and/or data. Embodiments of the system management tool 22 may use the BMC group management API 34 to communicate with the BMC group members to select and configure one of the BMCs 32 within the BMC group as the BMC group leader.

Figure 2:
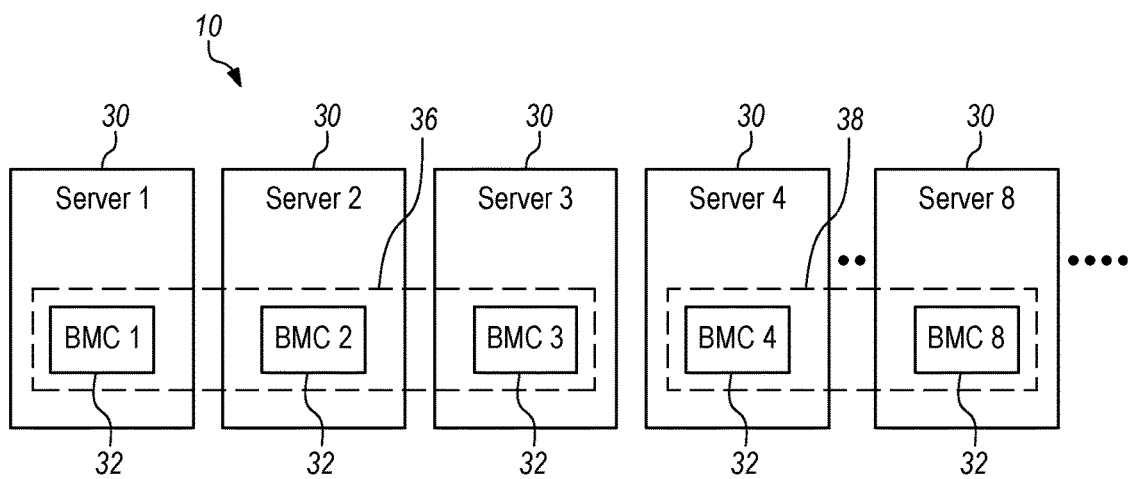
FIG. 2 is a diagram of a plurality of servers having baseboard management controllers BMC(s) that have formed BMC groups.

FIG. 2 is a diagram of a plurality of servers 30 having baseboard management controllers BMC(s) 32 that have formed BMC groups 36, 38 in a portion of the system 10. A first BMC group 36 includes three BMCs 32 (BMC1, BMC2 and BMC3) and a second BMC group 38 includes five BMCs 32 (BMC4-BMC8). The number of BMCs in a BMC group or the number of BMC groups is not critical and may vary according to the size of the computing system and the efficiency of BMC groups of various sizes. Any one of the BMCs 32 in the first BMC group 36 may be the BMC group leader at some point in time and any one of the BMCs 32 in the second BMC group 38 may be the BMC group leader at some point in time. As an example, assume that BMC2 is currently the BMC group leader for the first BMC group 36. As the BMC group leader, BMC2 would receive instructions from the system management tool (see FIG. 2) regarding any group operations that should take place within the first BMC group 36. While BMC1, BMC2 and BMC3 may each communicate directly with a system management application that includes the system management tool to perform routine system monitoring, reporting and control operations, any group operation for the first BMC group 36 will be sent to the BMC group leader, which is currently BMC2. Accordingly, BMC2 would interact with BMC1 and BMC3 to implement the group operation as to BMC1 and BMC3 rather than BMC1 and BMC3 receiving the group operation directly from the system management tool. If BMC3 was subsequently configured as the BMC group leader for the first BMC group 36 and BMC2 was unconfigured to no longer the be BMC group leader for the first BMC group 36, then the system management tool would send instructions regarding group operations to BMC3 as the BMC group leader. It would then be BMC3 that would interact with BMC1 and BMC2 to implement the group operation as to BMC1 and BMC2 rather than BMC1 and BMC2 receiving the group operation directly from the system management tool.

Figure 3:
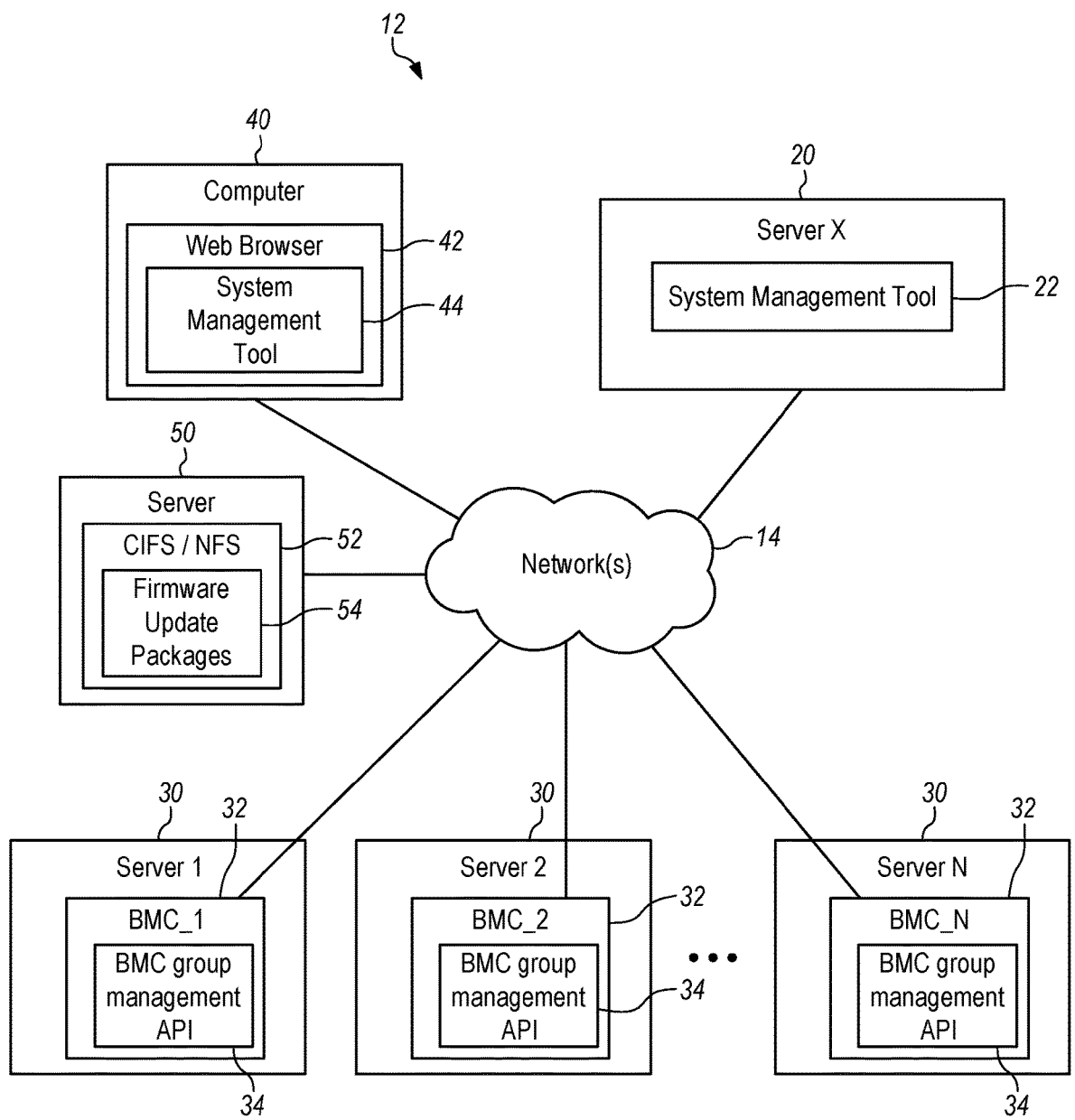
FIG. 3 is a diagram of a system that includes a computer with a web-browser that may communicate with the BMCs according to some embodiments.

FIG. 3 is a diagram of a system 12 that includes a computer 40 with a web-browser 42 that may communicate with the BMCs 32 according to some embodiments. Although the system management tool 22 may be run on the server 20 as described in reference to FIG. 1 and shown also in FIG. 3, the system management tool 44 may be run on the computer 40, which may be another server with no BMC, a computer running a Windows operating system, a computer running a Linux operating system, and similar computing systems. Using an Internet Protocol (IP) address for an agent web interface on the BMC 32, the web-browser 42 may provide interaction with the BMC 32 including support of communication between the system management tool 44 running on the computer 40 and the BMC group management API 34 running on the BMC 32.

Furthermore, the system management tool may be run on one of the BMCs 32 in the BMC group (for example, BMC group 36 in FIG. 2. For example, the system management tool may be a component of the BMC operating system, or a tool separate from the BMC operating system. For example, the system management tool in the BMC operating system may call the BMC group management API of each BMC in the BMC group, including the BMC in which the system management tool is running. Regardless of where the system management tool is run, the system management tool may call the BMC group management API 34 of any one or more of the BMCs 32 in the BMC group via an industry standard BMC interface, such as an Intelligent Platform Management Interface (IPMI), Redfish interface, Common Information Model (CIM) interface, etc. Redfish is a general term representing a Distributed Management Task Force (DMTF) standard that defines a set of BMC APIs that expose BMC functions. Several different computer manufacturers provide BMC Redfish APIs.

Also shown in FIG. 3 is a server 50 that supports a Common Internet File System (CIFS) and/or a Network File System (NFS) 52. The file system 52 may hold one or more firmware update packages 54, including a firmware update microcode to be applied the servers 30. Accordingly, a group operation that involves a firmware update may include the BMC group leader downloading one of the firmware update packages 54 over the network 14 from the server 50 and causing each BMC 32 in the BMC group to applying the downloaded firmware update package.

Figure 4:
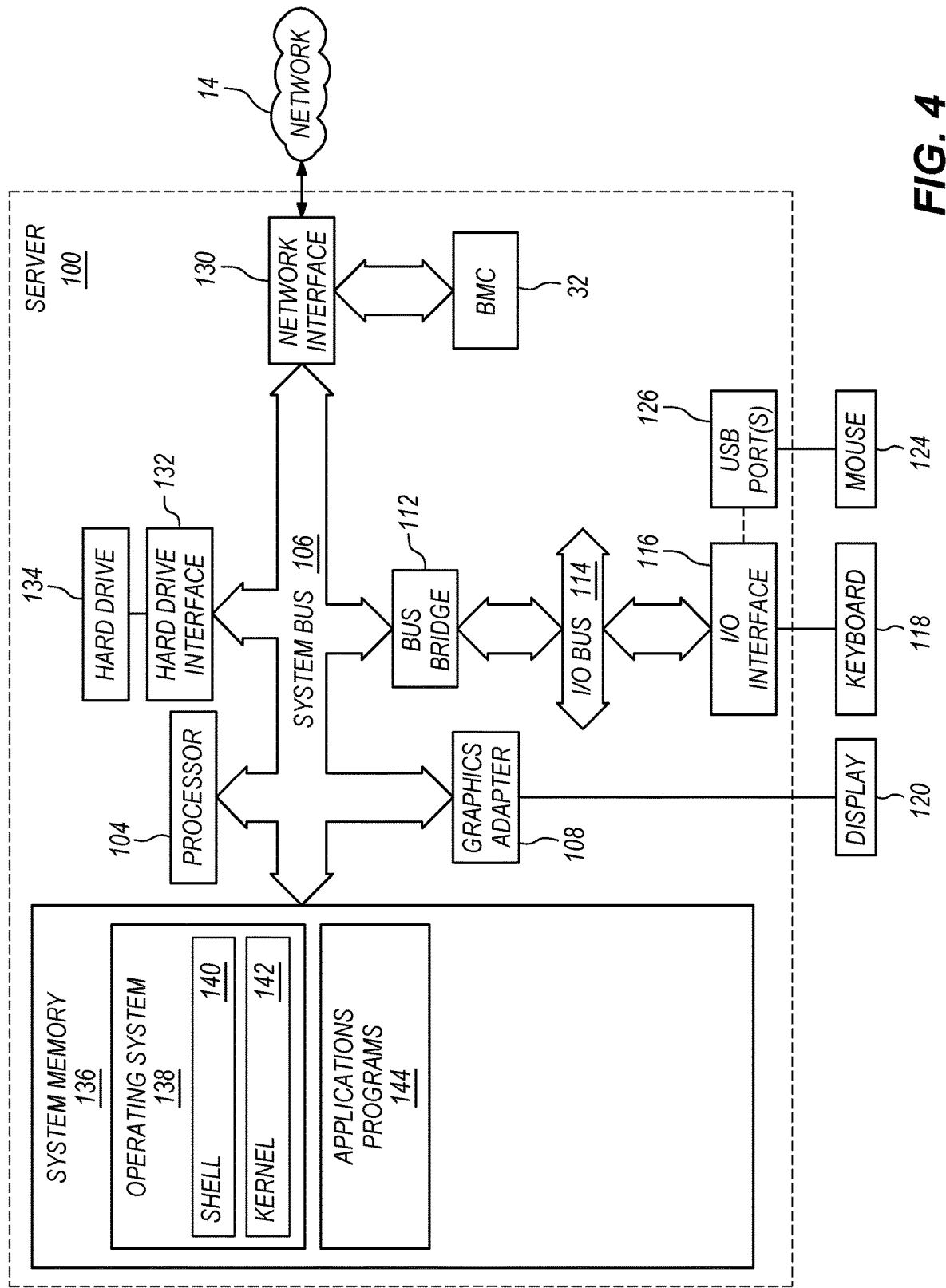
FIG. 4 is a diagram of one embodiment of a server that may be representative of the any one or more of the system management server 20, compute nodes or servers 30, computer 40 and the file server 50 of FIGS. 1-3.

FIG. 4 is a diagram of one embodiment of a server 100 that may be representative, but not limiting, of the configuration of any one or more of the system management server 20, compute nodes or servers 30, computer 40 and the file server 50 of FIGS. 1-3. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 (perhaps as a touch screen virtual keyboard), and a USB mouse 124 via USB port(s) 126 (or other type of pointing device, such as a trackpad). As depicted, the server 100 may communicate with other devices over the network 14 using a network adapter or network interface controller 130. For example, where the server 100 represents a compute node or server 30, the server 100 may communicate with the system management server 20, the computer 40 and/or the file server 50 over the network 14 consistent with system 10 of FIGS. 1-3. The hardware elements depicted in the server 100 are not intended to be exhaustive, but rather are representative. For instance, the server 100 may include non-volatile memory and the like.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as the lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include an application program that is a system management tool including program instructions that cause the processor 104 to perform the operations of the system management tool.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the server 100 includes application programs 144 in the system memory of the server 100, which application programs may include, without limitation, a system management tool.

In some embodiments, the server 100 may be representative of the hardware configuration of a managed compute node or server 30. Accordingly, the server 100 may further include a service processor, such as a baseboard management controller (BMC) 32. The BMC may be used to perform out-of-band processing and may monitor and manage various features of the hardware components of the server. Furthermore, the BMC 32 may run a BMC group management API (not shown; see FIGS. 1 and 3) to support BMC group management and group operations according to various embodiments, such as a group firmware update for a BMC group.

Figure 5:
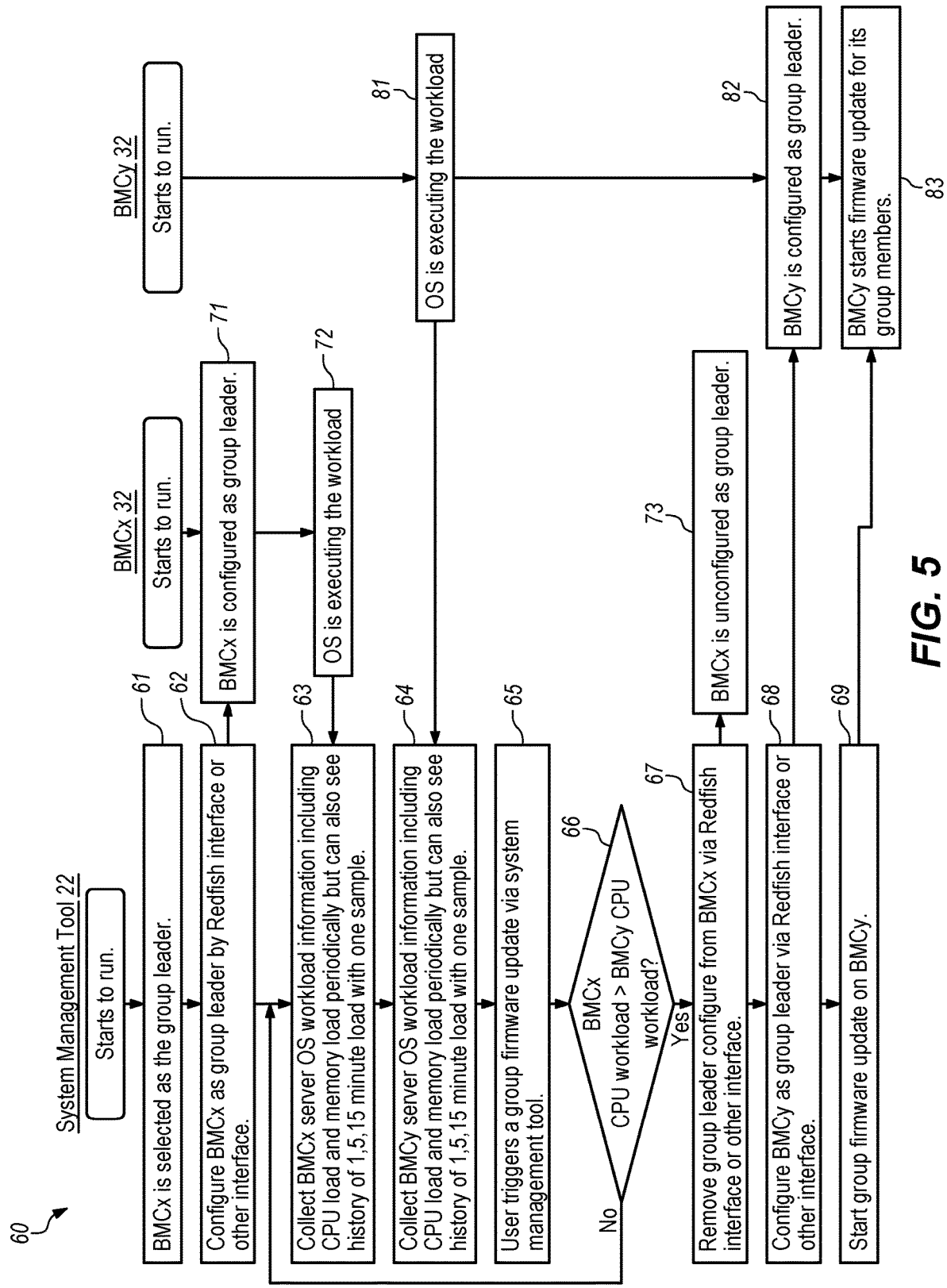
FIG. 5 is a flowchart illustrating operations and interactions of a system management tool with first and second BMCs within a BMC group.

FIG. 5 is a flowchart 60 illustrating operations and interactions of a system management tool 22 with a first BMC 32 and a second BMC 32 within a BMC group, such as BMC group 36 illustrated in FIG. 2. While the flowchart 60 emphasizes the operations of the system management tool 22 (or any other system management tool herein), the flowchart further illustrates certain interactions with the first (BMCx) and second (BMCy) BMCs 32.

In operation 61, BMCx is selected as the group leader for the BMC group that includes both the first (BMCx) and second (BMCy) BMCs 32. Operation 62 includes configuring BMCx as group leader by Redfish interface or other interface. Accordingly, in operation 71 BMCx is configured as the group leader. Subsequently, operation 72 includes the operating system of BMCx executing workload.

In operation 63, the system management tool 22 collects BMCx server OS workload information including CPU load and/or memory load, which may be collected periodically or may be collected as a history of 1, 5 and 15-minute average loads with one sample or request. Since BMCy is also executing workload in operation 81, operation 64 of the system management tool 22 may include collecting BMCy server OS workload information including CPU load and/or memory load, which may be collected periodically or may be collected as a history of 1, 5 and 15-minute average loads with one sample or request.

In operation 65, a user may trigger a group firmware update via the system management tool 22. Then, perhaps in response to the group firmware update being triggered, operation 66 determines whether BMCx has a CPU workload and/or memory workload that is greater than the CPU workload and/or memory workload of BMCy. If a negative determination is made in operation 66, then BMCx may start the firmware update for its group members and the process may return (see "No" branch) to operation 63.

However, if a positive determination is made in operation 66, then the process advances (see "Yes" branch) to operation 67 which includes removing group leader configure from BMCx (i.e., unconfigure BMCx from being group leader) via Redfish interface or other interface. Accordingly, operation 73 BMCx is unconfigured as group leader. Operation 68 includes configuring BMCy as group leader via Redfish interface or other interface, which operation is carried out on BMCy as operation 82. In operation 69, the system management tool 22 starts or initiates a group firmware update on BMCy. Accordingly, in operation 83, BMCy starts the firmware update for its group member which includes BMCx.

Figure 6:
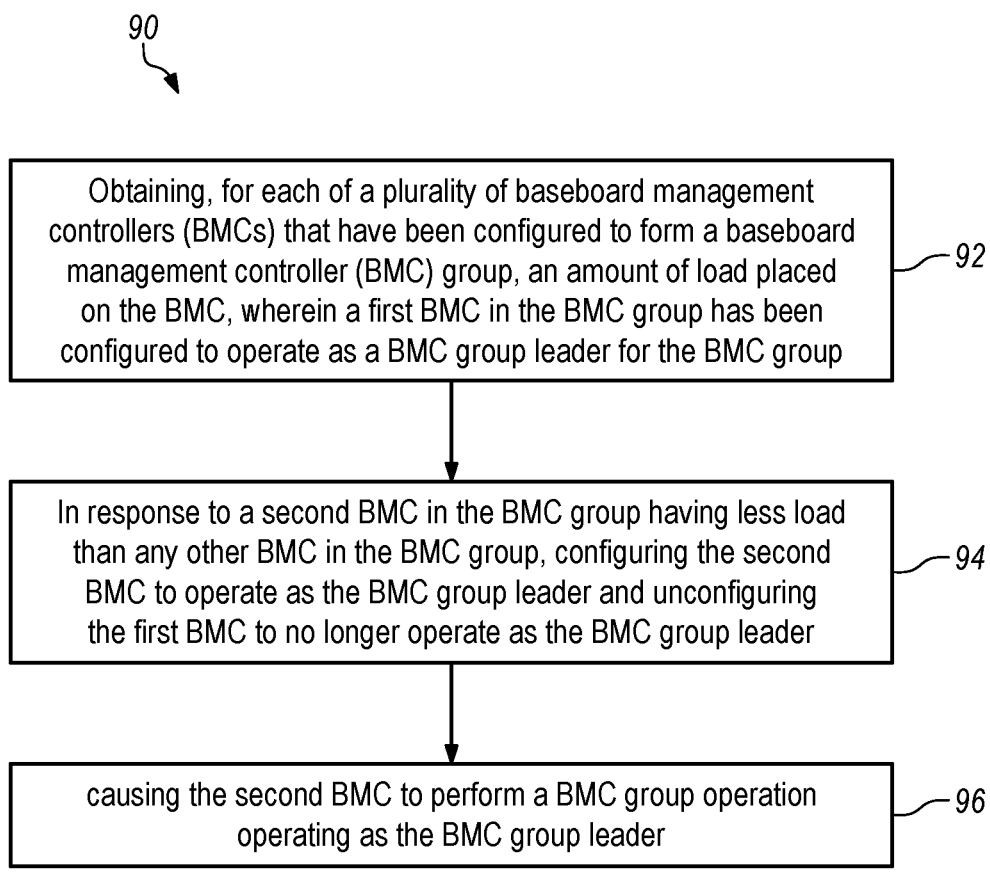
FIG. 6 is a flowchart of operations according to one embodiment.

FIG. 6 is a flowchart 90 of operations according to one embodiment of a system management tool (computer program product) or a method performed by a system management tool. Operation 92 includes obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group. Operation 94 includes, in response to a second BMC in the BMC group having less load than any other BMC in the BMC group, configuring the second BMC to operate as the BMC group leader and unconfiguring the first BMC to no longer operate as the BMC group leader. Operation 96 includes causing the second BMC to perform a BMC group operation operating as the BMC group leader.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out) various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
    obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group;
    in response to a second BMC in the BMC group having less load than any other BMC in the BMC group, configuring the second BMC to operate as the BMC group leader and unconfiguring the first BMC to no longer operate as the BMC group leader; and
    causing the second BMC to perform a BMC group operation operating as the BMC group leader.

2. The computer program product of claim 1, wherein the group operation includes initiating deployment of a group firmware update, operating system, configuration setting, license installation, and/or call home functionality.

3. The computer program product of claim 1, wherein the obtained amount of load placed on each BMC is obtained during a time period in which none of the BMCs in the BMC group are performing a group operation.

4. The computer program product of claim 1, wherein the obtained amount of load placed on each BMC is an amount of processor load and/or an amount of memory load.

5. The computer program product of claim 1, wherein the obtained amount of load placed on each BMC is an average load for at least one trailing time period.

6. The computer program product of claim 1, wherein the obtained amount of load placed on each BMC includes an average load for each of a plurality of trailing time periods, wherein the second BMC is determined to have less load than any other BMC in the BMC group in response to the second BMC having, for each of the plurality of trailing time periods, less average load than the average load of any other BMC in the BMC group.

7. The computer program product of claim 1, the operations further comprising:
   identifying that the BMC group operation is to be performed, wherein the operations of:
   obtaining, for each of plurality of baseboard management controllers (BMCs) that have been configured to form a baseboard management controller (BMC) group, an amount of load placed on the BMC, wherein a first BMC in the BMC group has been configured to operate as a BMC group leader for the BMC group; and
   in response to a second BMC in the BMC group having less load than any other BMC in the BMC group, configuring the second BMC to operate as the BMC group leader and unconfiguring the first BMC to no longer operate as the BMC group leader;
   are performed in response to identifying that the BMC group operation is to be performed.

8. The computer program product of claim 7, the operations further comprising:
   establishing, for each of the plurality of BMCs in the BMC group, communication with the BMC by calling a BMC group management application programming interface (API) running on the BMC.

9. The computer program product of claim 1, the operations further comprising:
   receiving user input creating the BMC group; and
   receiving user input assigning one or more of the BMCs to the BMC group.

10. The computer program product of claim 1, wherein each of the BMCs serve as an interface between system management and hardware of a server in which the BMC is installed, and wherein the amount of load placed on the BMC includes system management interface operations.

11. A computer program product comprising a non-volatile computer readable medium and non-transitory program instructions embodied therein, the program instructions being configured to be executable by a processor to cause the processor to perform operations comprising:
    periodically obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group;
    in response to a second BMC in the BMC group having a lower amount of load than the first BMC, configuring the second BMC to operate as the BMC group leader and unconfiguring the first BMC to no longer operate as the BMC group leader; and
    causing the second BMC to perform a BMC group operation operating as the BMC group leader.

12. A method, comprising:
    obtaining, for each of a plurality of baseboard management controllers (BMCs) that have been configured to form a baseboard management controller (BMC) group, an amount of load placed on the BMC, wherein a first BMC in the BMC group has been configured to operate as a BMC group leader for the BMC group;
    in response to a second BMC in the BMC group having less load than any other BMC in the BMC group, configuring the second BMC to operate as the BMC group leader and unconfiguring the first BMC to no longer operate as the BMC group leader; and
    causing the second BMC to perform a BMC group operation operating as the BMC group leader.

13. The method of claim 12, wherein the group operation includes initiating deployment of a group firmware update, operating system, configuration setting, license installation, and/or call home functionality.

14. The method of claim 12, wherein the obtained amount of load placed on each BMC is obtained during a time period in which none of the BMCs in the BMC group are performing a group operation.

15. The method of claim 12, wherein the obtained amount of load placed on each BMC is an amount of processor load and/or an amount of memory load.

16. The method of claim 12, wherein the obtained amount of load placed on each BMC is an average load for at least one trailing time period.

17. The method of claim 12, wherein the obtained amount of load placed on each BMC includes an average load for each of a plurality of trailing time periods, wherein the second BMC is determined to have less load than any other BMC in the BMC group in response to the second BMC having, for each of the plurality of trailing time periods, less average load than the average load of any other BMC in the BMC group.

18. The method of claim 12, the operations further comprising:
    identifying that the BMC group operation is to be performed, wherein the operations of:
    obtaining, for each of plurality of baseboard management controllers (BMCs) that have been configured to form a baseboard management controller (BMC) group, an amount of load placed on the BMC, wherein a first BMC in the BMC group has been configured to operate as a BMC group leader for the BMC group; and
    in response to a second BMC in the BMC group having less load than any other BMC in the BMC group, configuring the second BMC to operate as the BMC group leader and unconfiguring the first BMC to no longer operate as the BMC group leader;
    are performed in response to identifying that the BMC group operation is to be performed.

19. The method of claim 18, the operations further comprising:
    establishing, for each of the plurality of BMCs in the BMC group, communication with the BMC by calling a BMC group management application programming interface (API) running on the BMC.

20. The method of claim 12, the operations further comprising:
    receiving user input creating the BMC group; and
    receiving user input assigning one or more of the BMCs to the BMC group.

* * * * *